(No Model.)

F. H. RICHARDS.
CONE ADJUSTMENT.

No. 535,859.   Patented Mar. 19, 1895.

Witnesses:
J. L. Edwards Jr.
Fred. J. Dole.

Inventor:
F. H. Richards.

UNITED STATES PATENT OFFICE.

FRANCIS H. RICHARDS, OF HARTFORD, CONNECTICUT.

CONE ADJUSTMENT.

SPECIFICATION forming part of Letters Patent No. 535,859, dated March 19, 1895.

Application filed June 25, 1894. Serial No. 515,598. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Cone Adjustments, of which the following is a specification.

This invention relates to improvements in cone-adjustments for velocipedes, &c., and especially to the adjustment for the ball-races or bearings of bicycle crank-shafts; the object being to provide an improved means for readily adjusting the cone or track member and locking the same securely and positively in position when so adjusted.

Figure 1:
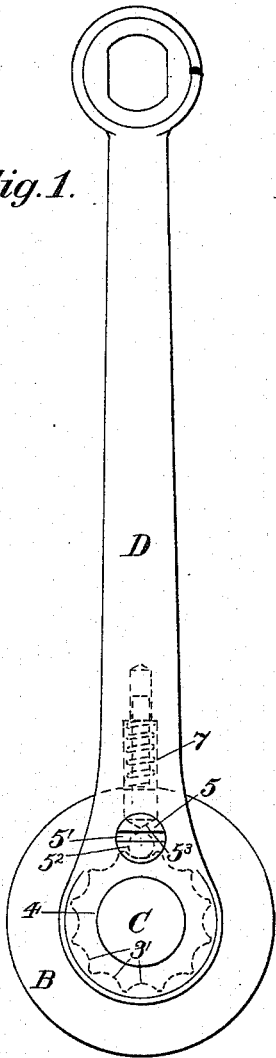
Figure 2:
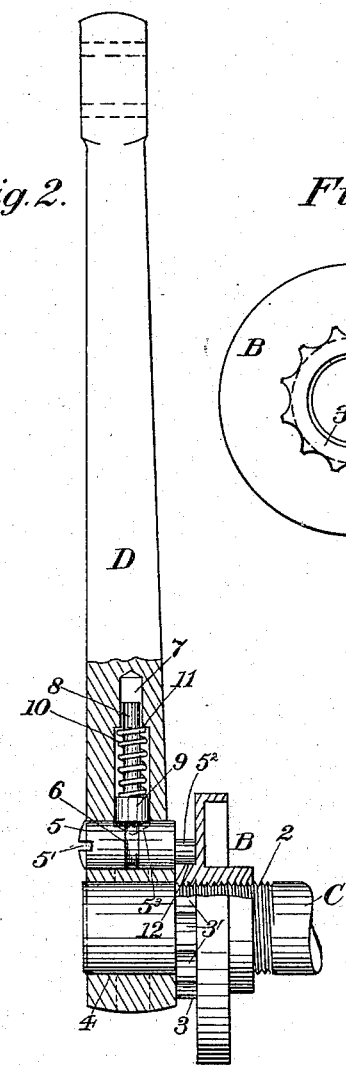
Figure 3:
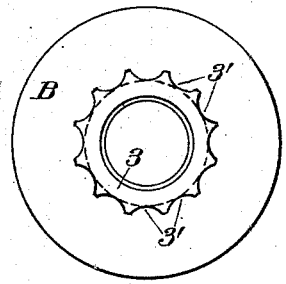

In the drawings accompanying and forming a part of this specification, Figure 1 is a side elevation of a bicycle-crank and shaft with my invention applied thereto. Fig. 2 is a central, sectional, front elevation of the same. Fig. 3 is a side elevation of the adjusting cone.

According to my present invention, the adjusting-cone or track-member, designated in a general way by B, is rotatable in the usual manner upon the screw-threaded portion 2 of the crank-shaft C, and is provided on its outer end with an annulus 3, having formed upon its edge or periphery the recesses 3'.

The crank, designated in a general way by D, is provided with the usual socket or bearing 4, for the reception of the end of the crank-shaft C, and is bored transversely upon its longitudinal center, for the reception of a rotatable stud or locking-member 5. This stud is provided in its head with an ordinary screw-slot 5', and upon its opposite end is formed an eccentric pin or revoluble locking device $5^2$. This pin is adapted to engage with and bind against the curved wall of any one of the recesses or notches 3', in the cone-ring or annulus 3, when said pin is in its lowermost position. In order to bring the pin into engagement with the walls of said recess the stud 5 is locked by means of a screw-driver, or similar implement, and the release of the pin from engagement with the recesses of the adjusting-cone or track-member, is effected in a similar manner. When the pin is not in engagement with one of said recesses the cone B may be turned or rotated upon the screw-threaded portion 2 of the crank-shaft, in the usual manner, until the proper adjustment of the balls in the ball-races is obtained. The pin $5^2$, is then brought into engagement with the adjacent recess in the periphery of the annulus 3. The stud 5, upon the side thereof opposite the pin $5^2$, is provided with a preferably V-shaped recess $5^3$, centrally disposed and having its center upon that diameter of the stud which passes through the center of the pin $5^2$ and is therefore coincident with the diameter of said pin. An annular groove or channel 6, extends around said stud from the recess or countersink $5^3$. The crank D is also provided with a central longitudinal bore 7, registering with the recess or countersink $5^3$. Within this bore works a detent-plug or bolt 8, having an enlarged head 9. This detent has a slight play within the bore, sufficient to release the head 9 thereof from engagement with the recess or countersink in the stud 5, and is normally forced into said recess by means of a coiled spring 10, surrounding the shank thereof, and held in place between the head of the detent and the stop-shoulder 11, which shoulder is formed by the reduced portion of the bore 7 in the crank.

The longitudinal axis of the detent is in line with the center of the recess $5^3$, and also with the center of the eccentric holding-pin $5^2$, so that when said pin is in engagement with any one of the recesses 3', of the annulus 3, the detent will engage, by its head 9, with the countersink or recess $5^3$ and thereby lock the stud 5, with its holding-pin $5^2$, against rotation.

The revoluble locking-device or pin $5^2$ and the recesses 3', are so disposed with relation to each other that the curved wall of the recess and the periphery of the pin engage each other snugly at their meeting faces or points 12, so that a firm hold upon the adjusting-cone is secured by the pin. This hold is maintained by the detent 8 until the release of the pin by the reciprocation of the stud 5, by means of a screw-driver or similar implement, when the cone may be rotated upon the screw-thread 2 of the shaft C, to obtain a new adjustment of the ball-races. The rotation of the stud will of course force the detent 8 out of the locking recess or countersink $5^3$, and the head of said detent will remain out of engagement with the recess until the holding pin upon the stud is again in engagement with one of the recesses or grooves of the adjusting-cone. The stud 5 cannot however, drop out of the transverse aperture in which it works, as the head of the detent is still in engagement with the groove or channel 6 extending circumferentially around the same, thereby locking the stud at all times, whether in operative relation to the cone-ring or not, against accidental displacement.

It will be evident that, by means of my improved cone-adjustment, I obtain a very secure hold upon the cone or track member, the same having been adjusted to the desired position and that jarring loose of the said cone by the motion of the bicycle or other velocipede is effectually prevented. Moreover a new adjustment of the cone cannot be made until the rotatable stud or locking-member is forcibly turned within its seat and the eccentric pin or revoluble locking-device released from engagement with the notches or recesses of the annulus 3. The strength of the crank is not in anywise impaired by this construction, as the longitudinal and transverse bores of relatively small diameter. The security of the hold is much greater than when the locking of the cone is effected in the ordinary manner, as said hold is in this case a positive one—that is, a single point upon the periphery of the cone is maintained in a constant, fixed relation to the crank, when said cone is in its adjusted position, and there is no danger of slipping of the cone, such as is present in constructions employing simply a frictional, locking medium, as a collar-nut held in place by the crank and capable of rotation or slipping upon the crank-shaft when the bicycle or other velocipede is in motion.

While I have described my invention as especially applicable to the crank-shaft of a bicycle or other velocipede, it will be evident that it is not limited in its scope to this use alone; as the adjustment may be employed wherever the holding-devices described can be mounted upon a member in fixed relation to a shaft upon which an adjusting-cone or track-member is mounted.

Having thus described my invention, I claim—

1. In a cone-adjustment for ball-bearings, the combination with the shaft, of a track-member having peripheral notches, a lock-carrying member maintained in fixed relation to said shaft, a peripherally-recessed smooth rotatable member mounted within said fixed member and having an eccentric revoluble therewith and adapted to be brought into engagement with said notches and to impart a slight movement of rotation to said track-member when not centered in a notch, whereby after approximate adjustment the track-member may be carried by said eccentric to the position of final adjustment and locking, and a spring-pressed detent in position and adapted for engaging in the recess of the rotatable member and thereby locking the eccentric in engagement with the track-member, substantially as described.

2. In a cone-adjustment for ball-bearings, the combination with the shaft, of a track-member having peripheral notches, a crank mounted upon said shaft and having a transverse aperture, a peripherally-recessed smooth stud rotatable in said aperture, an eccentric pin mounted upon the end of said stud and in position and adapted to be brought into engagement with the notches of the track-member and to impart a slight movement of rotation to said track-member when not centered in a notch, whereby after approximate adjustment the track-member may be carried by said eccentric-pin to the position of final adjustment and locking, and a spring-pressed detent working in a longitudinal bore in the crank and adapted for engaging the recess of the rotatable stud and thereby locking the eccentric pin in engagement with the track-member, substantially as described.

3. In a cone-adjustment for ball-bearings, the combination with a velocipede-crank-shaft, of a track-member having peripheral notches a crank mounted upon said shaft and having a transverse aperture, a peripherally-recessed smooth stud rotatable in said aperture, an eccentric pin revoluble upon the end of said stud and adapted to be brought into engagement with the notches of the track-member and to impart a slight movement of rotation to said track-member when not centered in a notch, whereby after approximate adjustment the track member may be carried by said eccentric pin to the position of final adjustment and locking, and a spring-pressed detent working in a longitudinal bore in the crank and adapted for engaging the recess of the rotatable stud and thereby locking the eccentric pin in engagement with the track member said detent being releasable from said recess by the rotation of the stud, substantially as described.

FRANCIS H. RICHARDS.

Witnesses:
FRED. J. DOLE,
A. L. THALHEIMER.